Jan. 18, 1927. 1,615,098
E. PÜRSCHEL
ARRANGEMENT FOR FEEDING VACUUM TUBES
Filed Sept. 30, 1922
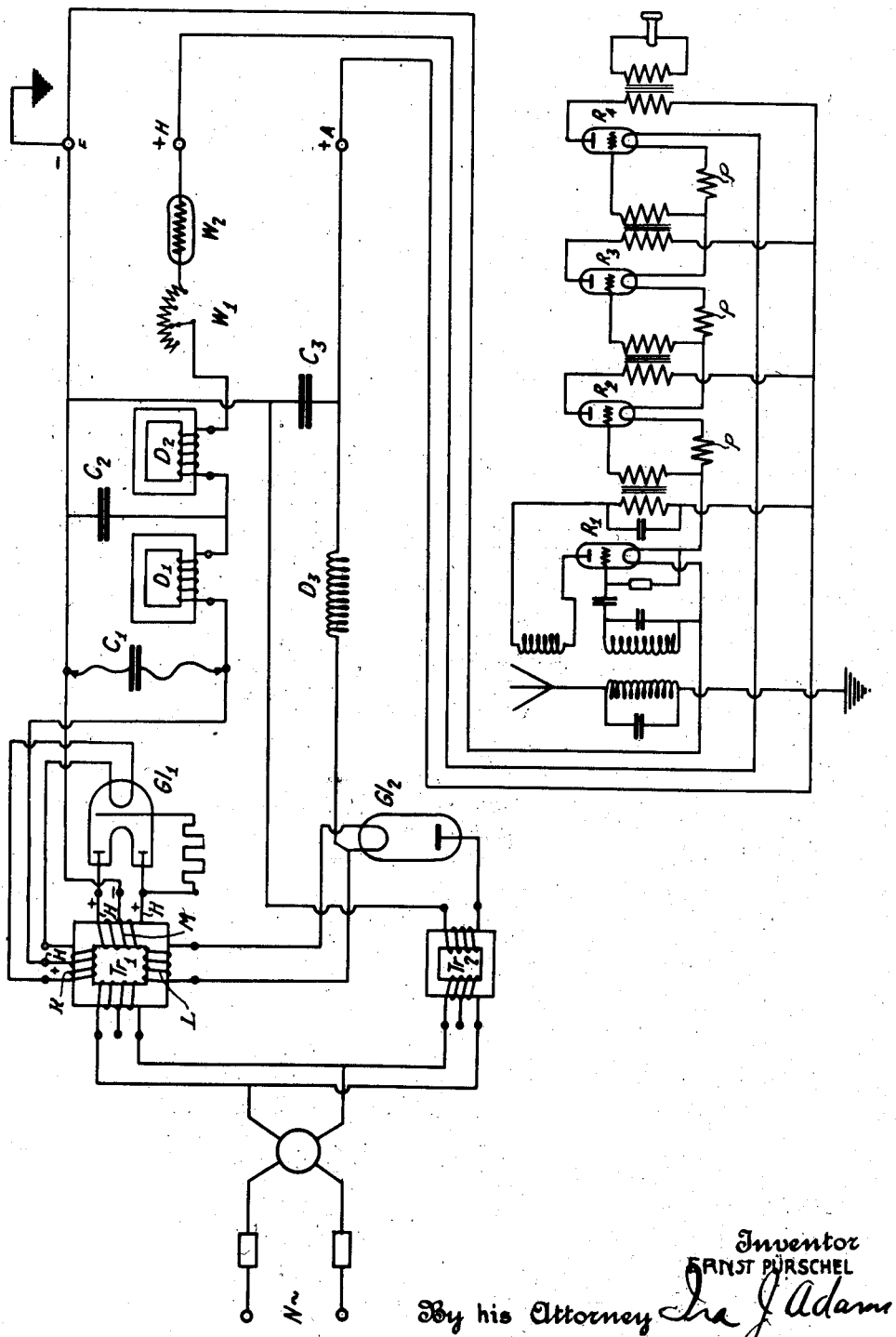
Inventor
ERNST PÜRSCHEL
By his Attorney Ira J. Adams Patented Jan. 18, 1927.

1,615,098

UNITED STATES PATENT OFFICE.

ERNST PÜRSCHEL, OF BERLIN, GERMANY, ASSIGNOR TO RADIO CORPORATION OF AMERICA, A CORPORATION OF DELAWARE.

ARRANGEMENT FOR FEEDING VACUUM TUBES.

Application filed September 30, 1922, Serial No. 591,480, and in Germany September 22, 1921.

The invention relates to an arrangement for feeding vacuum tubes used as receivers or amplifiers, and makes possible the connection of such apparatus to any available line carrying alternating current or to machines producing such currents, thereby rendering the provision of special batteries for filament heating and anode potential no longer necessary.

The accompanying drawing shows one exemplification of the present invention.

In the drawing, N indicates the end of an alternating current line. From this line the current passes in parallel through transformers $Tr_1$ and $Tr_2$. However, the two transformers may also be united.

The coils K and L respectively of the transformer $Tr_1$ supply the heating current for the heating current rectifier $Gl_1$ and the anode potential rectifier $Gl_2$. Furthermore, the coil M of such transformer supplies the alternating current to be rectified to the heating current rectifier $Gl_1$.

For the purpose of example, the drawing illustrates a duplex Wehnelt tube $Gl_1$ acting as a heating current rectifier and the anodes of the tube are connected to the opposite ends of the coil M so that current pulse is passed through the rectifier during each half of the alternating current waves. Due to this a pulsating direct current is produced beyond the rectifier $Gl_1$, and the number of pulsations in this current correspond to double the frequency of the alternating current in the line N.

The anode potential rectifier $Gl_2$ is, for the purpose of example, illustrated as a high vacuum, hot cathode tube which permits the passage of only one current pulse during each alternating current wave whereby pulsating direct current is obtained beyond rectifier $Gl_2$, having pulsations corresponding in number to the frequency of the current obtained from the line N.

The heating direct current supplied by $Gl_1$ is transmitted through a filter arrangement chain and series resistances to the cathodes of the receiving and amplifying tubes. It is very important that one pole of the direct current heating line be grounded. In the drawing the minus pole E is grounded.

The filter arrangement consists of two choke coils $D_1$ and $D_2$ and two condensers $C_1$ and $C_2$. The choke coils $D_1$ and $D_2$ must always be provided in the ungrounded conductor of the direct current heating supply. The condensers are in parallel with the heating current source in front of and between the choke coils. In certain receiving systems the condenser $C_1$ may be left out. The drawing shows also two series resistances of which $W_1$ is arranged for hand adjustment to be set only once, and $W_2$ is arranged for automatically equalizing variations in the current supply lines.

The drawing represents a set comprising four cathode tubes. The cathodes of the tubes are connected in series and with the negative and positive terminals E and H respectively. $R_1$ is an audion tube provided with back coupling; $R_2$, $R_3$ and $R_4$ are low frequency amplifying tubes. These have in their heating current supply circuit in front of the cathodes series resistances P from which the biasing grid potential is obtained.

A coil $D_3$ is preferably inserted in the positive lead of the anode circuit from the transformer $Tr_2$, and a condenser $C_3$ is arranged in said circuit in parallel with the tubes $R_1$, $R_2$, $R_3$ and $R_4$.

The present invention makes possible also the feeding of other tube combinations for high, medium or low frequency amplification. The series heating arrangement described for the purpose of example, affords the smallest volume for the choke coils $D_1$ and $D_2$ and for the heating current regulators $W_1$ and $W_2$.

The above described arrangement makes possible the feeding from an alternating current line of a set of cathode tubes comprising a plurality of stages for very large receiving amplification whereby the side tones are weakened to such an extent that the slightest signals or weakest speech will be left practically undisturbed. Furthermore, the speech distortion is eliminated by means of the present arrangement and it was just this speech distortion which made heretofore impossible the use of alternating current or pulsating direct current for the heating of the filament.

Having described my invention, what I claim is:

In a radio set, vacuum tubes having cathodes, grids and anodes, means for supplying current to the cathodes from a source of alternating current including a transformer having low potential secondary windings, a double wave thermionic rectifier associated with two of said windings and filtering circuits for the rectifier, a single wave thermionic rectifier, said cathodes being connected in series with resistances between them for producing a biasing potential between the grids and cathodes of the tubes, means for supplying the anodes with current, including a second transformer with a single secondary winding, said winding being associated with the output of the single wave thermionic rectifier, filtering circuits being associated with the single wave rectifier, said filtering circuits having a common connection, the separate connections for each circuit including inductances, whereby a difference of potential between the vacuum tubes and the rectifiers produced by radio frequency currents is prevented.

ERNST PÜRSCHEL.